United States Patent [19]

Lee

[11] 4,271,386
[45] Jun. 2, 1981

[54] POWER FACTOR CONTROLLER FOR INDUCTION MOTOR

[75] Inventor: Maw H. Lee, Broadview Heights, Ohio

[73] Assignee: The Scott & Fetzer Company, Cleveland, Ohio

[21] Appl. No.: 100,516

[22] Filed: Dec. 5, 1979

[51] Int. Cl.³ .............................................. H02P 5/40
[52] U.S. Cl. .................................... 318/729; 318/798; 318/812
[58] Field of Search ............... 318/729, 798, 809, 812, 318/438

[56] References Cited

U.S. PATENT DOCUMENTS

| | | | |
|---|---|---|---|
| 3,441,823 | 4/1969 | Schlabach | 318/809 X |
| 3,443,188 | 5/1969 | Mortimer | 318/809 X |
| 4,052,648 | 10/1977 | Nola | 318/812 |
| 4,176,307 | 11/1979 | Parker | 318/812 |
| 4,190,793 | 2/1980 | Parker et al. | 318/812 |

Primary Examiner—Gene Z. Rubinson
Attorney, Agent, or Firm—Pearne, Gordon, Sessions, McCoy & Granger

[57] ABSTRACT

A phase-triggered, gate-controlled AC semiconductor switch, in series with an induction motor and its AC supply, optimizes power flow to the motor under changing mechanical load conditions by varying the amount of supply voltage applied to the motor over each half-cycle of the AC supply. The triggering point of the switch relative to the preceding zero crossing point of the supply voltage, that is, the switch firing angle or delay angle, is varied as a function of mechanical loading on the motor by means of a load current-induced feedback voltage augmenting to a varying degree the charging rate of a capacitor which triggers the semiconductor switch into conduction. Under increasing mechanical load conditions, the feedback voltage increases in proportion to the increasing load current, the increasing feedback voltage accelerating the charging rate of the capacitor to trigger the switch into conduction at a reduced firing angle, wherein power flow to the motor is increased. Conversely, under decreasing mechanical load conditions, the feedback voltage decreases in proportion to the decreasing load current, the decreasing feedback voltage decelerating the charge rate of the capacitor to trigger the switch into conduction at an increased firing angle, wherein losses caused by reactive current in the less-than-fully-loaded induction motor are reduced with a resultant optimization of power factor.

8 Claims, 2 Drawing Figures

POWER FACTOR CONTROLLER FOR INDUCTION MOTOR

BACKGROUND OF INVENTION

The present invention relates to electronic controllers for motors adapted to drive varying or less than full mechanical loads, and more particularly, to control circuits for automatically reducing the power applied to a less-than-fully-loaded AC induction motor, such reduced power application reducing losses caused by reactive current to improve the power factor of the induction motor.

U.S. Pat. No. 4,052,648 to Nola discloses an AC induction motor control circuit of the subject type which utilizes a Triac switch (TRIAC is a trademark of The General Electric Company of Syracuse, New York) in series with an induction motor to lessen the time of supply voltage application to the motor, on a half-cycle basis, the time of supply voltage application being inversely proportional to the power factor (greater current lag; lessening mechanical load) which is sensed by load voltage and load current sampling. In effect, Nola continuously senses the phase angle between the load voltage and load current, and then uses a phase angle-related signal to continuously adjust the firing point of the Triac switch relative to the zero crossing point of the line voltage. For a sensed increasing phase angle (decreasing power factor) between load voltage and load current, Nola shifts the Triac firing point away from the line voltage zero crossing point to apply a smaller portion of each half-cycle of the line voltage, which inherently decreases the phase angle (increasing power factor) and reduces the heat loss ($I^2R$) caused by the reactive current.

While Nola recognizes the energy-saving advantages of duty cycle controlling an induction motor as a function of load with a series-inserted, phase-triggered Triac switch, his phase angle measuring requirement and the resultant circuitry are undesirably complex and costly as compared to the relative simplicity and low cost of a small, single phase induction motor which exhibits the greatest need for reliable power factor regulation.

U.S. application Ser. No. 042,608, filed May 25, 1979, by the inventor in the present application discloses an electronic controller which senses load current only in providing effective power factor control of an induction motor. While this current sensing only controller represents a substantial improvement over the earlier-discussed Nola device, it still requires a considerable number of components, resulting in costs which detract from its advantages in some applications.

SUMMARY OF THE INVENTION

In accordance with the present invention, an electronic controller for regulating power applied by an AC supply to an AC induction motor is provided to improve the power factor of the motor over a range of varying mechanical loads.

A gate-controlled semiconductor AC switching means, connected in electrical series relationship with the AC supply and the induction motor, is combined with means for detecting current pulse through the motor when the AC switching is in a conducting state. The means for detecting includes a resistor means in series with the motor, the resistor means providing a proportional voltage pulse for each load current pulse.

The proportional voltage pulse provided by the resistor means is impressed across the primary side of a transformer means having a nonlinearly responding secondary side. The secondary side provides, in response to the proportional voltage, a secondary voltage pulse having a trailing feedback portion existent subsequent to the impressed voltage pulse across the primary side.

A control means responsive to the trailing feedback portion amplitude triggers the semiconductor switch into a conducting state subsequent to the preceding zero crossing point of the supply voltage. The time period between the zero crossing point and the triggering is proportional to the amplitude of the feedback portion, the switching means switching to a nonconducting state generally at the trailing edge of each load current pulse.

DETAILED DESCRIPTION OF THE PREFERRED EMBODIMENT

Figure 1:
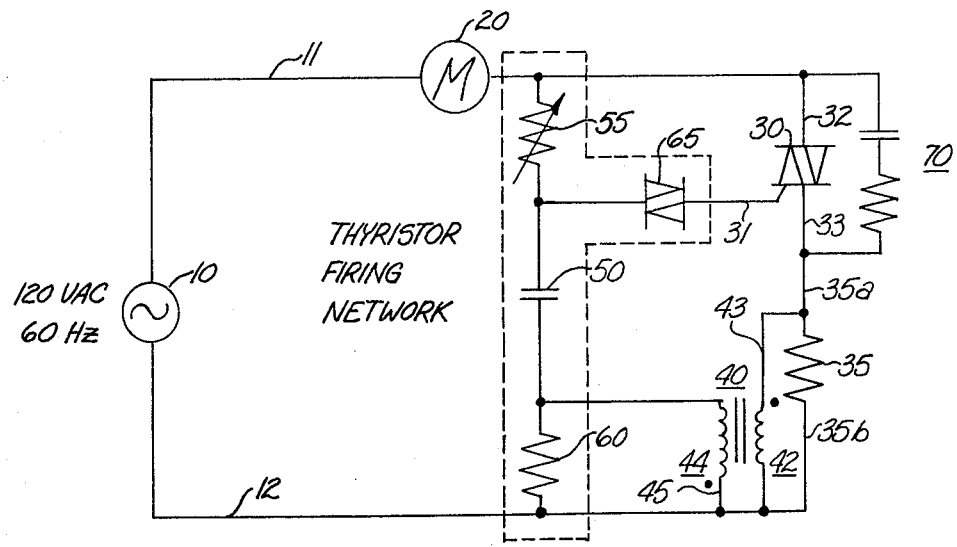
FIG. 1 is a schematic diagram of a circuit incorporating the present invention.

Turning to FIG. 1, a conventional, single-phase AC supply 10 of, for example, 120 volts AC at 60 hertz is provided. Typically, the supply 10 takes the form of a pair of commercial power lines 11, 12. The AC supply 10 provides and applies power to a single-phase AC induction motor 20 of a conventional type, the supply 10 and the motor 20 being connected in electrical series relationship as illustrated wherein current flow through the supply 10 and the motor 20 is substantially equivalent.

Power applied by the supply 10 to the motor 20 is regulated by a series-inserted, gate-controlled semiconductor AC switching means in the preferred form of an NPNPN-type thyristor switch 30 commonly known as a "Triac" (trademark of The General Electric Company of Syracuse, New York). As used herein, the term "thyristor" is intended to cover gate-controlled semiconductor switches such as silicon-controlled rectifiers and Triacs, which are in effect two silicon-controlled rectifiers connected back-to-back with a common gate. Such switches are well known in the art and are characterized by their ability to turn themselves off when their anode voltage is reduced to a point where a predetermined holding current limit through the thyristor is not maintained, resulting in the switch returning or recovering to a nonconducting state to block subsequently applied anode voltage-induced current flow.

To complete the series circuit relationship of the supply 10, the motor 20, and the gate-controlled switching means 30, a small ohmic value current sampling resistor 35 typically of 0.01 ohms is provided. In normal operation, with the switch 30 in a fully conducting state, power is applied to the motor 20 by the supply 10 wherein generally all alternating current flow is through the supply 10, the motor 20, the thyristor switch 30, and the current sampling resistor 35. In effect, these four elements are in electrical series relationship with each other.

In accordance with known principles, the thyristor switch 30 can be phase-triggered on a half-cycle basis to apply more or less power to the motor 20, the degree of power application being dependent on the time period between the zero crossing point of the supply voltage and the firing point of the switch 30, such time period being commonly referred to as "the delay angle" or "the firing angle" of the switch 30. When the motor 20 is experiencing a light mechanical load, the firing angle of the switch 30 is maximized to limit power application to the motor or duty-cycle control of the motor to preclude a large current lag (low power factor) and resultant $I^2R$ losses caused by reactive current. Conversely, under an increasing mechanical load conditions, the firing angle of the switch 30 is gradually and proportionally reduced to apply more power to the motor to preclude motor stalling while maintaining an acceptable power factor. Such principles are disclosed in the heretofore-noted U.S. Pat. No. 4,052,648 to Nola and my earlier-noted pending application.

In accordance with the present invention, the current sampling resistor 35 serves as a means for detecting alternating direction load current pulses through the motor 20 when the switching means 30 is in a conducting state, the resistor 35 providing across it a proportional voltage pulse for each load current pulsed.

A step-up transformer 40, preferably in the form of an audio transformer, having a low-voltage, primary winding side 42 and a nonlinearly responding, high voltage, secondary winding side 44, is provided. The proportional voltage pulse generated across the current sampling resistor 35 is impressed across the primary side 42 of the transformer means 40. In accordance with the present invention, the nonlinearly responding secondary side 44, in response to the proportional voltage impressed across the primary side 42, provides an induced secondary voltage pulse having a trailing feedback portion existing subsequent to the impressed voltage pulse across the primary side, the amplitude of the trailing feedback portion being proportional to the corresponding current pulse amplitude.

A control means responsive to the trailing feedback portion triggers the thyristor switch 30 into a conducting state subsequent to the preceding zero crossing point of the supply voltage, the time period between the zero crossing point and the triggering being proportional to the amplitude of the feedback portion. A more detailed discussion of the feedback portion control voltage and its application to effect power factor control of the motor 20 will be given subsequently in more detail with regard to FIG. 2.

In a preferred form, the control means includes a thyristor firing network having, in electrical series relationship, a capacitor 50, a current limit resistor 55, and a charging resistor 60. The current limit resistor 55 has one end connected to one side of the capacitor 50, while the charging resistor 60 also has one end connected to the other side of the capacitor 50. The other ends of the current limit resistor 55 and the charging resistor 60 are connected respectively to the other end 35b of the current sampling resistor 35 and a thyristor power lead 32 not connected to an end 35a of the current sampling resistor 35, the end 35a of the resistor 35 being connected to another thyristor power lead 33.

The thyristor firing network further includes a two-lead alternating current semiconductor switch, for example, a "Diac" (a trademark of The General Electric Company of Syracuse, New York). One lead of the two-lead alternating current semiconductor switch 65 is connected to a gate lead 31 of the thyristor switch 30, while the other lead of the two-lead switch 65 is connected to the interconnection junction of the current limit resistor 55 and the capacitor 50. The secondary side 44 of the transformer is connected in parallel across the charging resistor 60.

The operation of the thyristor firing network in conjunction with the transformer 40 and the current sampling resistor 35 will now be discussed with reference to FIGS. 1 and 2.

Figure 2:
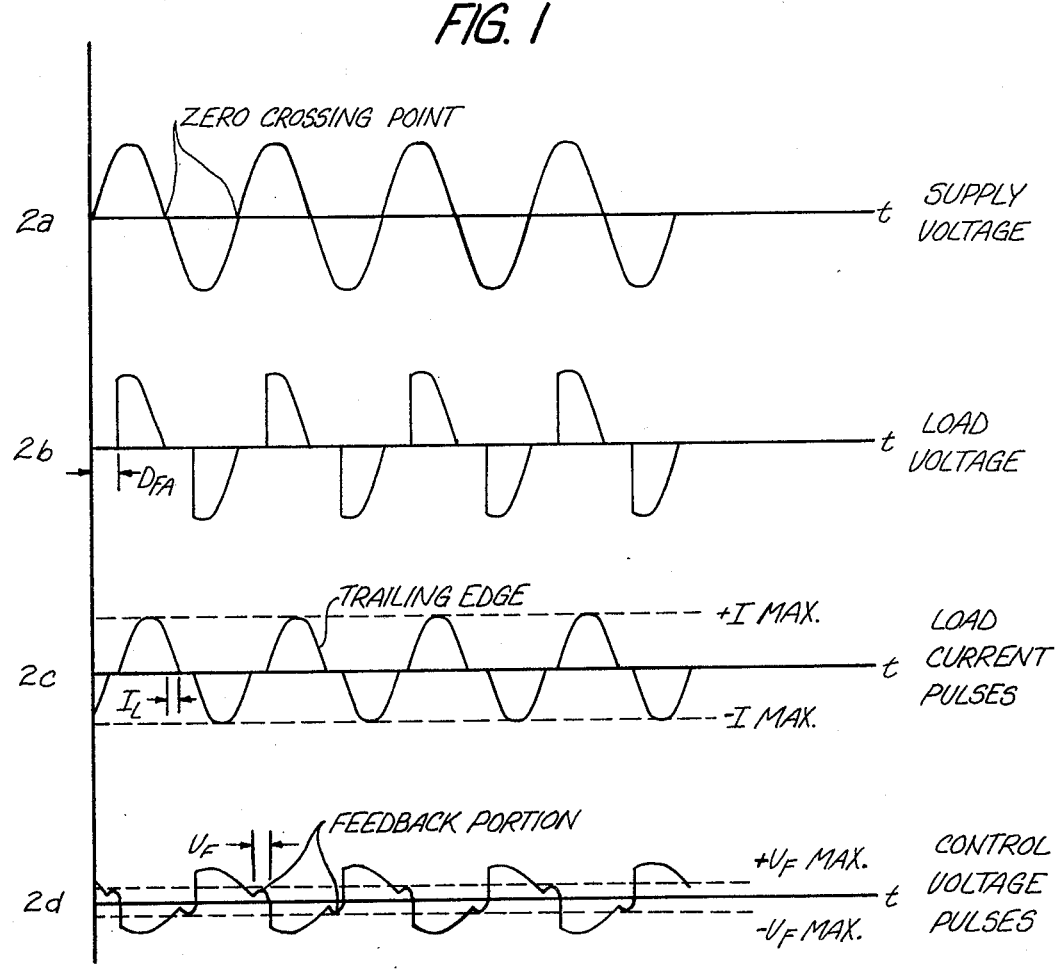
FIG. 2 is a graphical representation of various voltages and currents present under operating conditions in the circuit illustrated in FIG. 1.

Waveform 2a of FIG. 2 illustrates a sinusoidal AC supply voltage provided across the supply 10. FIG. 2b represents the load voltage across the motor 20 under a steady state less-than-full-load condition, wherein only a portion of each half-cycle of the supply voltage is applied to the motor 20 to effect power factor optimization in accordance with earlier-discussed, known techniques to minimize the load current lag $I_L$ as illustrated in waveform 2c. The firing angle or phase delay angle $D_{FA}$, that is, the time period between the zero crossing point of the supply voltage and the triggering of the thyristor switch 30 is illustrated by waveform 2b. FIG. 2c illustrates the load current pulses through the motor 20 and, necessarily, through the switch 30 and the current sampling resistor 35.

In view of waveforms 2a, 2b, and 2c, and with reference to FIG. 1, the switch 30 is triggered at the firing angle $D_{FA}$, which is determined by the rate of charging of the capacitor 50, which upon reaching a predetermined voltage breaks down the two-lead alternating current switch 65 which triggers or fires the triac switch 30 into conduction. The circuit configuration and operation of the switches 30, 65, the capacitor 50, and the current limit resistor 55 are well known in the art. The switch 30 returns to a nonconducting condition at the slightly lagging, trailing edge (see FIG. 2c) of each load current pulse (generally near zero crossing point of supply voltage), as is the characteristic of thyristor switches discussed earlier. With the switch 30 in a nonconducting state, the capacitor 50 begins charging from the supply 10 via the current limit resistor 55 and charging resistor 60 (approximately 560 ohms), the current limit resistor being typically of a high value, such as 100 kilohms, to provide the necessary RC time constant for establishing the desired thyristor firing angle $D_{FA}$. The current limiting resistor 55, as its name implies, draws very little load current, and hence, as noted earlier, substantially all of the load current passes through the switch 30 and the current sampling resistor 35. The supply voltage 10 acts as a primary so as to charge the capacitor 50 at a predetermined rate. It can be seen that the deletion of the charging resistor 60 and the transformer 40 would provide a constant firing angle $D_{FA}$, regardless of changing load conditions on the motor 20.

To provide for feedback control of the charging for the capacitor 50 in accordance with the present invention, the secondary side 44 of the transformer provides control voltage pulses illustrated in FIG. 2d. The transformer, as discussed earlier, has a secondary side 44 which is a nonlinearly responding step-up winding. The stepped-up secondary voltage is desirable to the small voltage induced by the load current cross the low ohmic value resistor 35. The step-up function of the transformer 40 could be eliminated if the ohmic value of the sampling resistor 35 were increased. As illustrated, the primary winding side 42 includes a polarity-marked lead 43 connected to the interconnection junction of the power lead 33 and the end 35a of the resistor 35. The secondary winding side 44 also includes a polarity-marked lead 45 connected to the end of the charging resistor 60 not connected to the capacitor 50. For given polarity voltage pulses through the primary side 42 (and in particular nonsinusoidal voltage pulses), the secondary side 44 does not provide proportional mirror image secondary voltage pulses but, rather, provides, as illustrated in waveform 2d, secondary voltage pulses having trailing feedback portions $V_F$ that are existent subsequent to the impressed voltage pulse across the primary side corresponding to the respective load current pulse (waveform 2c). This feedback portion is applied in proper polarity relation, as determined by the earlier-noted interconnection of the transformer 40, across the charging resistor 60 to assist as a secondary source in the charging of the capacitor 50 during the nonconducting period of the switch 30. The charging resistor is desirable to provide a primary charging and discharging path for the capacitor 50, since the secondary side winding 44 may have a high impedance.

It can be seen that the supply voltage and the feedback portion of the induced secondary voltage are in phase to act in additive fashion as the charging source for the capacitor 50.

In accordance with the present invention, the feedback portion $V_F$ acts as a secondary charging source to the capacitor 50 to accelerate or decelerate its charging rate to, in effect, shift the firing angle $D_{FA}$ away from or toward the preceding zero crossing point of the supply voltage.

While FIG. 2 illustrates the operation of the circuit of FIG. 1 under a steady state, less-than-full-load condition, the response of the circuit to a dynamic changing mechanical load on the motor 20 can easily be envisioned.

An increasing mechanical load on the motor 20 increases the amplitude of the load current pulses (waveform 2c) through the current sampling resistor 35. Under the increasing load condition, the motor is, in effect, calling for more power. Since the amplitude of the load current pulses through the resistor 35 increases, the proportional voltage impressed across the primary side 42 of the transformer proportionally increases to provide a secondary induced voltage of increased amplitude having an increased amplitude feedback portion $V_F$ as illustrated in waveform 2d. Since the amplitude of the feedback portion $V_F$ is increased, the charging rate of the capacitor 50 is necessarily accelerated wherein it reaches the predetermined firing point voltage of the two-lead alternating current switch 65 at a point closer in time to the preceding zero crossing point of the supply voltage to decrease the firing angle $D_{FA}$. In turn, decreasing the firing angle $D_{FA}$ applies more of each half-cycle of supply voltage to the motor for increased power application. Conversely, the lessening of mechanical load on the motor 20 causes a corresponding drop in the amplitude of the load current pulses, which in turn causes a corresponding proportional drop in the amplitude of the trailing feedback portion $V_F$ wherein the charging rate of the capacitor 50 is decelerated so as to increase the firing angle $D_{FA}$ and thus apply less power to the motor. It should also be noted that, since the load is a motor 20, as opposed to for example an incandescent lamp, a conventional snubber network 70 (dv/dt suppression) parallel to the switch 30 is provided to improve commutation and prevent false turn-on of the switch 30.

It can be seen that a relatively simple and fast-acting, positive feedback control circuit is provided to effect half-cycle response to power factor control of the motor 20. While the illustrated application of the invention has been directed to a single-phase circuit, it is clearly within the contemplation of the invention that the teaching of the present invention also applies to polyphase motor control circuits.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An electronic controller for regulating power applied by an AC supply to an AC induction motor, comprising:

a gate-controlled semiconductor AC switching means connected in electrical series relationship with the AC supply and the induction motor, power being applied to the motor via the AC switching means;

means for detecting alternating direction load current pulses through the motor when the AC switching means is in a conducting state, the means for detecting including a resistor means in series with the motor, the resistor means providing a proportional voltage pulse for each load current pulse;

a transformer means having a primary side and a nonlinearly responding secondary side, the proportional voltage pulse provided by the resistor means being impressed across the primary side, the nonlinearly responding secondary side, in response to the proportional voltage, providing an induced secondary voltage pulse having a trailing feedback portion existent subsequent to the impressed voltage pulse across the primary side, the amplitude of the trailing feedback portion being proportional to the corresponding current pulse amplitude; and control means responsive to the trailing feedback portion amplitude, the control means triggering the semiconductor switch into a conducting state subsequent to the preceding zero crossing point of the supply voltage, the time period between the zero crossing point and the triggering being poroportional to the amplitude of the feedback portion, the switching means switching to a nonconducting state generally at the trailing edge of each load current pulse.

2. An electronic controller according to claim 1, wherein the control means includes a capacitor, the capacitor charging to a predetermined voltage to trigger the semiconductor switch into a conducting state, the amplitude of the feedback portion determining at least in part the charging rate of the capacitor to effect feedback contol of the time period between the zero crossing point and the triggering.

3. An electronic controller according to claim 2, wherein the capacitor is simultaneously charged by the feedback portion and the AC supply voltage acting together additively.

4. An electronic controller for regulating power applied by an AC supply to an AC induction motor comprising:

a gate-controlled thyristor switch connected in electrical series relationship with the AC supply and the induction motor, power being applied to the motor via the thyristor switch;

means for detecting load current pulses through the motor when the thyristor switch is in a conducting state, the means for detecting including a low ohmic value resistor in series with the motor, the resistor providing a proportional voltage pulse for each load current pulse;

a step-up transformer having a primary side and a nonlinearly responding secondary side, the primary side being electrically connected in parallel relation across the resistor, the proportional voltage pulse provided by the resistor being impressed across the primary side, the nonlinearly responding secondary side providing in response to the proportional voltage an induced, stepped-up, secondary voltage pulse having a trailing feedback portion existent subsequent to the impressed voltage pulse across the primary side, the amplitude of the trailing feed-back portion being proportional to the corresponding current pulse;

a thyristor firing network connected to the gate of the thyristor, to the secondary side of the transformer, and to the AC supply, the firing network including a capacitor which generally begins charging at the zero crossing point of the AC supply voltage, the thyristor gate being triggered by the firing network when the capacitor charges to a predetermined voltage, a primary charging source for the capacitor being the AC supply voltage, a secondary charging source for the capacitor being the feedback portion, the AC supply voltage and the feedback portion combining additively to charge the capacitor means to trigger the thyristor switch into a conducting state, the thyristor switching to a nonconducting state generally at the trailing edge of each load current pulse.

5. An electronic controller according to claim 4, wherein the feedback portion is applied across a charging resistor in electrical series relationship with the capacitor.

6. An electronic controller according to claim 4, wherein the transformer is an audio-frequency transformer.

7. An electronic controller for regulating power applied by an AC supply to an AC induction motor comprising:

a gate-controlled, NPNPN-type, AC thyristor switch having a single gate electrode and a pair of load current-carrying power leads, the thyristor switch being connected via its power leads in electrical series relationship with the AC supply and the induction motor, power being applied to the motor via the power leads;

means for detecting load current pulses through the motor when the thyristor switch is in a conducting state, the means for detecting being constituted by a low ohmic value current sampling resistor in series with the motor, the current sampling resistor providing a proportional voltage pulse for each load current pulse, the current sampling resistor having one of its ends connected to one of the power leads of the thyristor switch;

a step-up transformer having a primary side and a secondary side, the primary side being electrically connected in parallel relation across the current sampling resistor, the proportional voltage pulse provided by the current sampling resistor being impressed across the primary side, the nonlinearly responding secondary side providing in response to the proportional voltage an induced, stepped-up, secondary voltage pulse having a trailing feedback portion existent subsequent to the impressed voltage pulse across the primary side, the amplitude of the trailing feedback portion being proportional to the corresponding current pulse amplitude;

a thyristor firing network including in electrical series relationship a current limit resistor, a capacitor, and a charging resistor, the current limiting resistor having one end connected to one side of the capacitor, the charging resistor having one end connected to the other side of the capacitor, the other ends of the current limit resistor and the charging resistor being connected respectively to the other end of the current sampling resistor and the thyristor power lead not connected to the end of the current sampling resistor, the network further including a two-lead alternating current semiconductor switch, one lead of the two-lead switch being connected to the gate of the thyristor, the other lead of the two-lead switch being connected to the junction of the current limit resistor and the capacitor, the secondary side of the transformer being connected in parallel across the charging resistor, the feedback portion assisting charging of the capacitor via the current limiting resistor when the thyristor switch is in a nonconducting state, the two-lead switch breaking down to fire the thyristor into conduction and to discharge the capacitor at a predetermined voltage attained by the capacitor.

8. An electronic controller according to claim 7, wherein the primary side and the secondary side of the transformer each comprise a winding having one polarity-marked lead, the polarity-marked lead of the primary winding being connected to the junction of one of the power leads and the current sampling resistor, the secondary winding polarity-marked lead being connected to the end of the charging resistor not connected to the capacitor.

* * * * *